Nov. 12, 1946.  S. G. WASHBURN  2,411,072
AUTOMATIC IMPLEMENT LIFT FOR PLOWS
Filed May 27, 1944
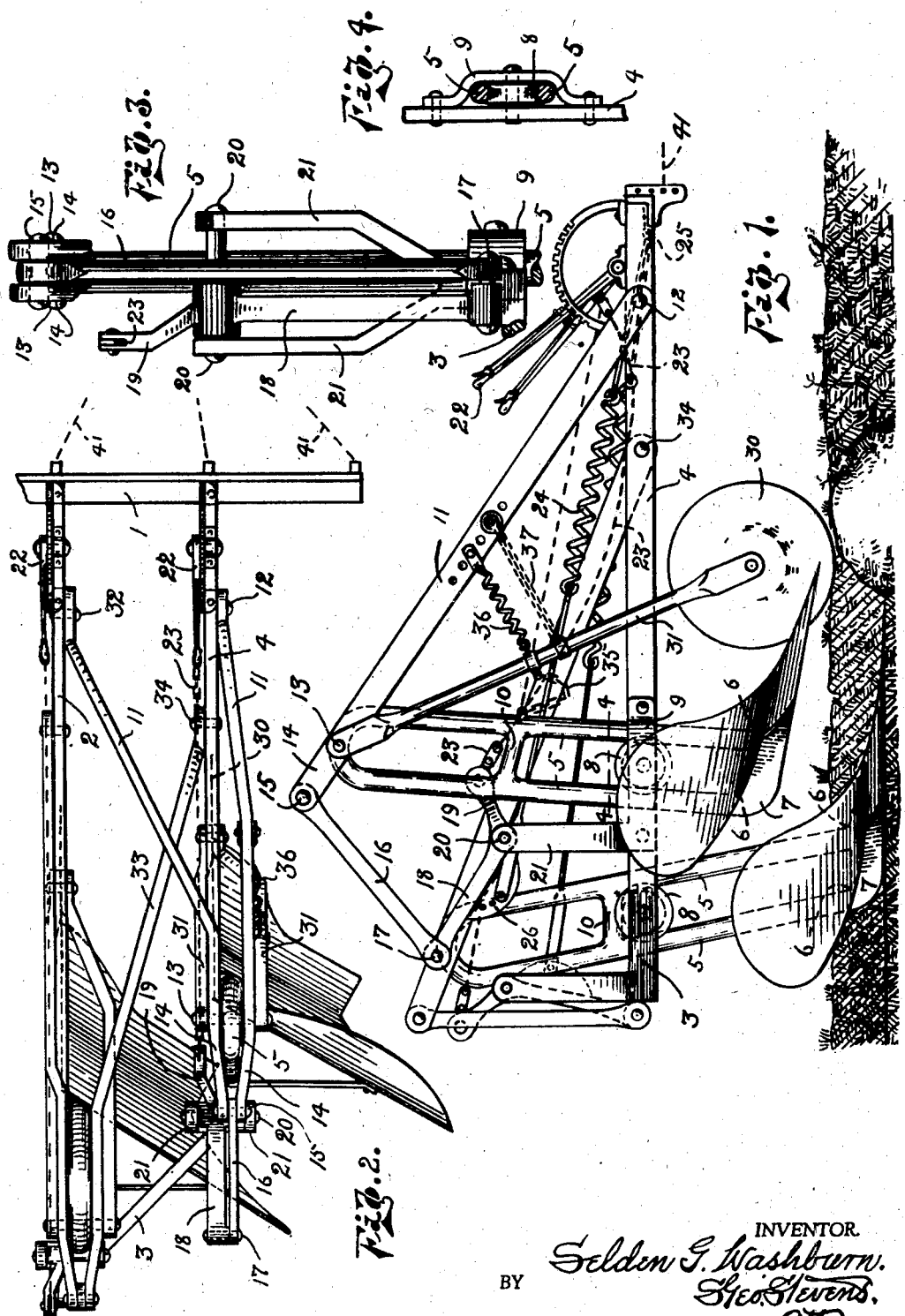
INVENTOR.
Selden G. Washburn.
BY Geo. Stevens.
Atty.

Patented Nov. 12, 1946

2,411,072

UNITED STATES PATENT OFFICE 2,411,072

AUTOMATIC IMPLEMENT LIFT FOR PLOWS

Selden G. Washburn, Goodwin, S. Dak.

Application May 27, 1944, Serial No. 537,686

3 Claims. (Cl. 97—74)

This invention relates to agricultural plows, and has special reference to one that might aptly be referred to as a beamless plow.

The principal object is to provide means for support of a plow that will alleviate the abuse thereto when engaging obstructing objects such as large stones or the like while plowing.

Another object is to provide such auxiliary supporting means of as simple and durable construction as possible.

Other objects and advantages may appear in the further description of the invention.

Referring now to the accompanying drawing forming part of this application and in which like reference numerals indicate like parts:

Fig. 1 is a side elevation of a two-bottom gang or sulkey plow embodying the invention and showing one of the plows as being in danger of engagement with an obstruction, as a large stone or other object, and automatically jumping up and over it.

Fig. 2 is a top plan view of Fig. 1.

Fig. 3 is an enlarged rear elevation of the toggle equipment for one of the plows, and Fig. 4 is a horizontal sectional view on the line 4—4 of Fig. 1 illustrating the cooperation between the guiding sheave holder and the leg of one of the plows.

In the drawing, 1, 2, 3, and 4 represent cooperative parts of one form of practical rigid metal chassis for the two-bottom sulkey which is preferably made of angle or channel bars commonly used for such purposes.

The following description will be confined principally to the near raised plow, which it is thought, will adequately cover the instant invention as the equipment for a different assembly of bottoms may vary considerably in chassis construction.

Now, in place of a beam disposed usually horizontally and above the plow or plows proper for drawing same through the ground, the chassis above referred to, provides such means, and the plow is equipped to function at will, to a limited extent at least, independently of the action of the chassis.

To accomplish this, I have provided the elongated open link-like leg 5—5 fixed as at 6—6 to the heel of the landside 7 of the plow, said leg being reciprocably as well as rockably attached to one beam of the chassis, which in this instance, as we are describing only the nearer one of the plows shown, is the beam 4. This pivotal support comprises the roller or sheave-like member 8 loosely journaled within an offset bearing intermediate of the beam 4 and the encompassing bracket 9 provided for the purpose. This bearing also functions as the fulcrum for the leg during its rocking movement.

The stock of which this leg 5—5 is formed, is preferably of round iron to more closely fit into the opposite sides of the sheave 8, and to limit the lowermost permanent working position of the plow, the cross-bar member is formed intermediate of the opposed spaced members 5—5 of the leg and spaning said space so that when the plow has traveled to its downward limit, the cross-bar 10 will rest directly upon the sheave 8.

As control and auxiliary support for the plow I have provided the sort of toggle connection including the major bracing members 11—11, one of which is pivotally attached at its lowermost forward end to the member 4 of the chassis as at 12, and the other attached as at 32 to the member 2 of the chassis, while the opposite ends of these braces are pivotally attached as at 13 to the upper arched end of the leg 5—5 and beyond which point 13 they extend somewhat as at 14 where they pivotally carry as at 15 the arm 16 connected at 17 to the long arm 18 of the bell-crank lever, the opposite or short arm being illustrated at 19 and the lever pivoted as at 20 between the upright spaced and fixed members 21—21 rigidly supported upon the rearmost terminal of the beam 4 of the chassis.

This bell-crank lever controls the raising and lowering of the plow either automatically or by hand and for which latter purpose, the forward end of the chassis is equipped with any suitable form of hand lever 22 therefor, which of course, must be always set with sufficient slack in its connection to the short arm 19 of the bell-crank control lever to permit the automatic functioning of the plow when normally at work, such yieldable connection may be in the form of a chain as shown at 23 or a longitudinally slotted bar, not shown.

Now the power for the automatic functioning of the plow is provided by the relatively strong contractile helical spring 24 installed within the leash 40 which is attached at one end to the forward end of the chassis as at 25 and at its opposite end to the depending quadrant 26 fixed to the under side of the arm 18 of the bell-crank lever, this quadrant being for convenient selective adjustment of the tension of the spring 24.

Obviously, this spring must be of sufficient strength and normal tautness to hold the arm 18 in its lowermost vertical position when it and the arm 16 are jackknifed together as shown in connection with the other plow in the drawing that is at work, and at which time the pivotal connection 15 is slightly rearwardly of the stationary pivotal point 20 in the support 21—21.

Thus any upward stress at the upper ends of the braces 11—11, for example, by the colter 30 engaging an obstruction as shown in Fig. 1 of the drawing, will tend to open the jackknifed attitude of the toggle members just described and permit the plow to jump over the obstruction engaged, thence instantly, by gravity, and aid of the spring 24, return to its work in the furrow.

As a colter for such a plow, I prefer to use the disk or roller type, as shown at 30, which may have, as here illustrated, a double supporting arm 31—31 attached pivotally and externally of the braces 11—11 and upon the same pivot therewith as at 13, thus simplifying the toggle connection and making it susceptible to functioning by the action of the colter as well as possibly by the action of the plow.

These colter supporting arms 31—31 are tethered as at 35 to the leg 5—5 of the plow so that the colter can not move beyond a predetermined distance above or forwardly beyond the point of the plow, depending upon the type of plowing being done and/or the nature of the land being worked.

These colter supporting arms are also yieldably attached to the brace 11 above same by means of the contractile helical spring 36, these arms also having an auxiliary limiting attachment as at 37 whereby to insure upward or jumping action of the plow as well as the colter after the latter has engaged a material obstruction that otherwise might have done damage.

It so happens that in the construction of a two-bottom chassis as shown, it is advantageous to utilize portions of the toggle bracing in cooperatively uniting parts of the chassis, and to which end, one of the braces 11 between which the uppermost arcuate end of the plow leg 5—5 is pivoted, extends diagonally forwardly over to the other side member 2 of the chassis, and pivotally attached thereto at 32 as previously stated.

A similar brace 33 functions in a like manner for the lowered or working plow and is brought over diagonally therefrom and pivotally attached as at 34 to the side member 4 of the chassis, thus stabilizing the latter structure materially as well as adding support for the plows.

There is suggested at 41 means for attachment to a tractor or other power for pulling the sulky, it being obvious that this would vary considerably and according to circumstances and does not form any part of this invention.

While I have shown and described one form of specific novel toggle mechanism for permitting automatic action of a plow to prevent its being damaged when an obstruction is encountered, it is to be understood that the same may be varied materially without departing from the spirit of the invention as set forth in the appended claims.

What I claim is:

1. In automatic release means for a plow; a supporting chassis for said plow, a vertically reciprocal rockable beam for said plow carried by said chassis and supporting said plow dependingly therefrom, a roller bearing within and for said beam, carried by said chassis, a colter carried by said chassis and beam and operable with said plow, and means associated with said plow and colter to cause the colter, when engaging an obstruction in advance of said plow, to lift the latter over said obstruction.

2. In combination; a frame-like chassis, a plow supported by said chassis, an open vertically movable beam supporting said plow from said chassis, a rotatable bearing carried by said chassis forming the connection of said beam with said chassis to permit said vertical movement, a lever pivotally attached at one end to the forward end of said chassis and adjacent the opposite end pivotally attached to the upper end of said beam, compound toggle means pivotally attached at the extreme rearmost end of said lever and supported by said chassis and manually operable from the forward end thereof for raising and lowering said plow, a colter supporting arm pivoted at its upper end at the union of said lever and said beam, and contractile spring means connecting said colter arm with said beam to normally keep said colter ahead of said plow whereby when said plow and colter are in normal working position and said colter contacts an obstruction in advance of said plow, said plow and colter will automatically be raised away from said obstruction.

3. In a plow and chassis therefor of the character described; means including a reciprocal beam rigidly fixed to said plow and a colter suspended from the upper end of said beam and operable in advance of said plow for automatically raising same from injuriously contacting an obstruction in the furrow being made by said plow, said means further characterized by being pivotally guided from the forward end of said chassis.

SELDEN G. WASHBURN.